United States Patent
Li et al.

(10) Patent No.: US 8,098,687 B2
(45) Date of Patent: Jan. 17, 2012

(54) METHOD AND APPARATUS FOR FORWARDING PACKETS

(75) Inventors: Ming Ta Li, Jhubei (TW); Shen Po Lin, Jhubei (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 186 days.

(21) Appl. No.: 12/499,763

(22) Filed: Jul. 8, 2009

(65) Prior Publication Data

US 2010/0183010 A1    Jul. 22, 2010

(30) Foreign Application Priority Data

Jan. 20, 2009    (TW) .................... 98101996 A

(51) Int. Cl.
*H04J 3/16*    (2006.01)

(52) U.S. Cl. ........................ 370/469; 370/389

(58) Field of Classification Search ........................ None
See application file for complete search history.

(56) References Cited

U.S. PATENT DOCUMENTS

| | | | |
|---|---|---|---|
| 5,805,816 A * | 9/1998 | Picazo et al. | 709/223 |
| 6,449,256 B1 * | 9/2002 | Varghese et al. | 370/238 |
| 6,542,496 B1 * | 4/2003 | Hiroati et al. | 370/351 |
| 6,628,653 B1 * | 9/2003 | Salim | 370/389 |
| 6,876,653 B2 * | 4/2005 | Ambe et al. | 370/389 |
| 7,046,629 B2 * | 5/2006 | Wu et al. | 370/230.1 |
| 7,876,710 B2 * | 1/2011 | Rustagi et al. | 370/254 |
| 2010/0183010 A1 * | 7/2010 | Li et al. | 370/392 |

* cited by examiner

*Primary Examiner* — Robert Wilson
(74) *Attorney, Agent, or Firm* — Hamre, Schumann, Mueller & Larson, P.C.

(57) ABSTRACT

A method for forwarding packets first checks a forwarding table of a bridge to find whether the destination information for a packet is included in the forwarding table. If the information is found, this packet is forwarded to the destination through a physical layer directly without passing through the bridge. This method improves the efficiency of the frame aggregation of an AP (Access Point) and enhances the throughput in a WLAN (Wireless Local Area Network).

14 Claims, 7 Drawing Sheets

METHOD AND APPARATUS FOR FORWARDING PACKETS

BACKGROUND OF THE INVENTION

1. Field of the Invention

The present invention relates to a communication system, and more particularly, to a method and apparatus for forwarding packets.

2. Description of the Related Art

Before transmitting a packet by an access point (AP), the media access control (MAC) layer of a wireless local area network (WLAN) needs to wait for a distribution coordination function interframe space (DIFS) and a random backoff time when using a WLAN carrier sense multiple access/collision avoidance (CSMA/CA) method. FIG. 1 shows a frame forwarding diagram, wherein a first frame and a second frame each includes one packet. If there are two packets to be transmitted, two DIFSs and two backoff times have to be employed. In order to increase the forwarding efficiency for a WLAN, the first frame with one packet and the second frame with the other packet can be aggregated with a frame aggregation method. FIG. 2 shows an aggregated frame forwarding diagram. It is shown that one DIFS and one backoff time are used. However, the efficiency of a frame aggregation method relies on the time when the AP receives the packets. If the time spent receiving each packet is excessive, the probability of successful frame aggregations and the forwarding efficiency in the WLAN are decreased.

FIG. 3 shows a diagram illustrating a bridge connecting a plurality of interfaces. In a communication system with the same communication protocol, packets sent from an interface 302 are forwarded to other interfaces 303-304 via a bridge 301.

FIG. 4 shows a sequence for forwarding a packet. The destination interface in FIG. 4 is the interface of an AP.

FIG. 5 shows a conventional flowchart for forwarding packets. At step S501, a packet is forwarded from a source interface. When the packet is received by a bridge, the bridge compares the destination address of the packet with addresses stored in the forwarding table of the bridge at step S502. If the destination address of the packet matches an address stored in the forwarding table, the packet is forwarded to a destination interface. At step S503, the packet is received by the destination interface. At step S504, the buffer of an AP is checked to find a preceding packet. At step S505, if the preceding packet exists in the buffer, the packet and the preceding packet are aggregated into an aggregated frame. At step S506, the aggregated frame is forwarded through the AP. If the preceding packet does not exist, the packet is temporarily stored in the buffer at step S507. At step S508, a waiting time is set for waiting for the next packet. If the waiting time expires, the packet is forwarded directly through the AP without aggregation.

The packet forwarding method described above needs a bridge to forward a packet to another interface. However, if a central processing unit (CPU) has a comparatively low processing speed or if the CPU resources are used for physical layers by priority, packet forwarding tasks might be procrastinated. Further, frame aggregation tasks of an AP and the efficiency of WLAN communication can also be affected. Therefore, an efficient method for forwarding packets is needed for the market to accelerate packet forwarding speed and to increase the frame aggregation efficiency of APs.

SUMMARY OF THE INVENTION

The objective of the present invention is to provide a method and apparatus for forwarding packets. By checking a forwarding table and comparing the information of a source interface with information of a destination interface, a forwarding path is determined for forwarding a packet.

One embodiment of the present invention discloses a method for forwarding packets comprising the steps of: forwarding a packet to a second working layer through an interface of a first working layer; checking registered data of a forwarding table in the second working layer and submitting a result to the first working layer; performing a comparison operation in the first layer to obtain a comparison result; and determining a forwarding path for a packet in accordance with the comparison result.

Another embodiment of the invention discloses an apparatus for forwarding packets comprises a decision unit and a checking unit. The decision unit is placed in a first working layer for comparing information of a source interface with information of a destination interface. The checking unit is placed in a second working layer for checking a forwarding table and generating a checking result, and the checking result is subsequently submitted to the decision unit. A forwarding path for a packet is determined in accordance with the results generated from the decision unit and the checking unit.

BRIEF DESCRIPTION OF THE DRAWINGS

The invention will be described according to the appended drawings in which.

PREFERRED EMBODIMENT OF THE PRESENT INVENTION

Figure 1:
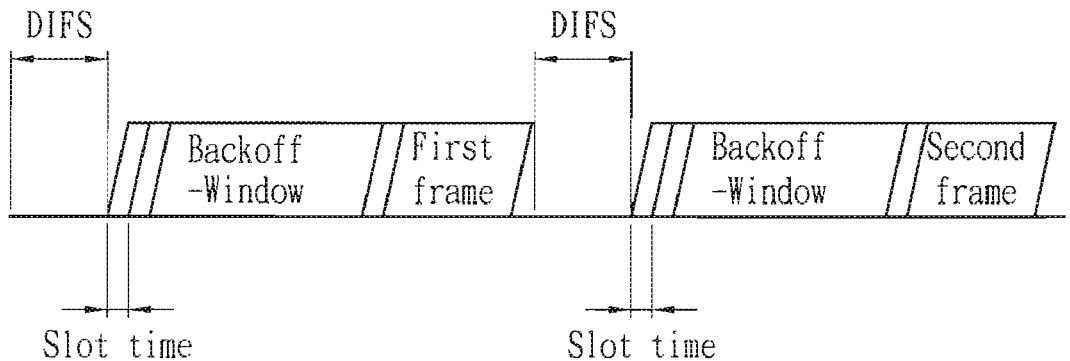
FIG. 1 shows a frame forwarding diagram.
Figure 2:
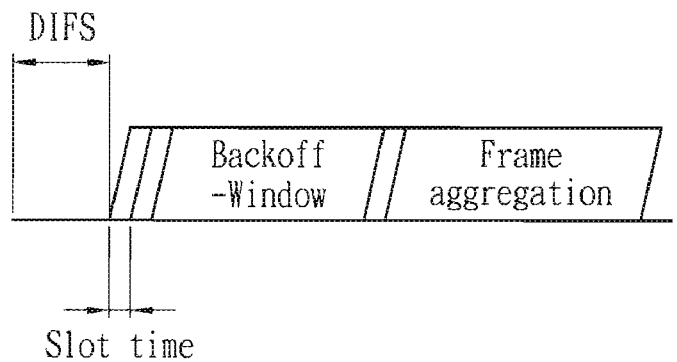
FIG. 2 shows an aggregated frame forwarding diagram.
Figure 3:
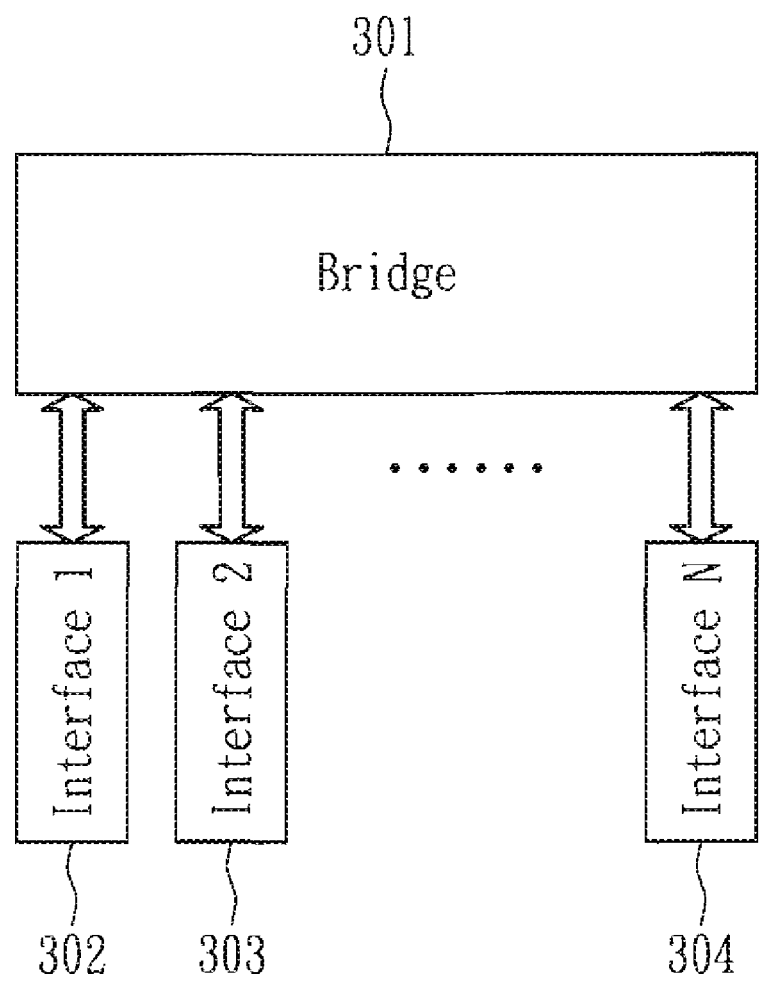
FIG. 3 shows a bridge connecting a plurality of interfaces.
Figure 4:
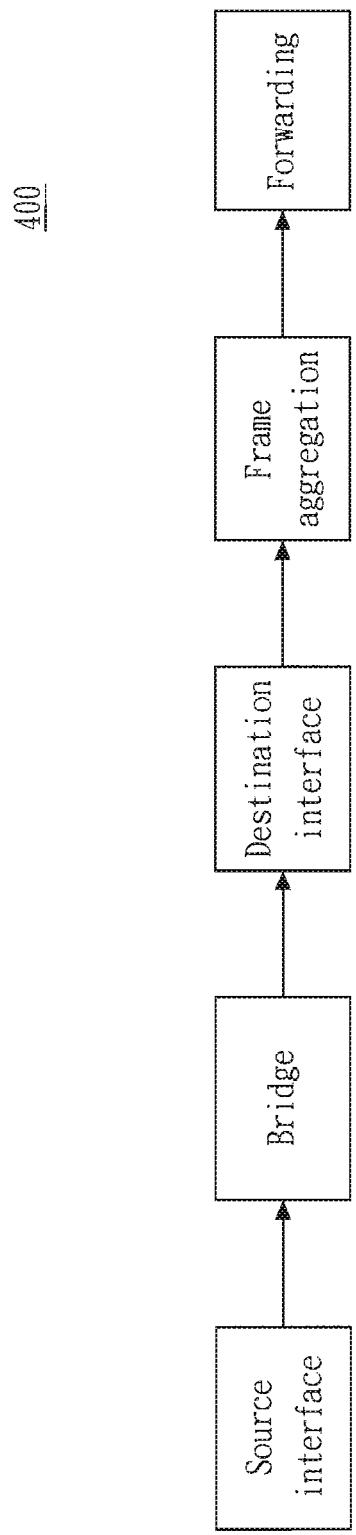
FIG. 4 shows a sequence for forwarding a packet.
Figure 5:
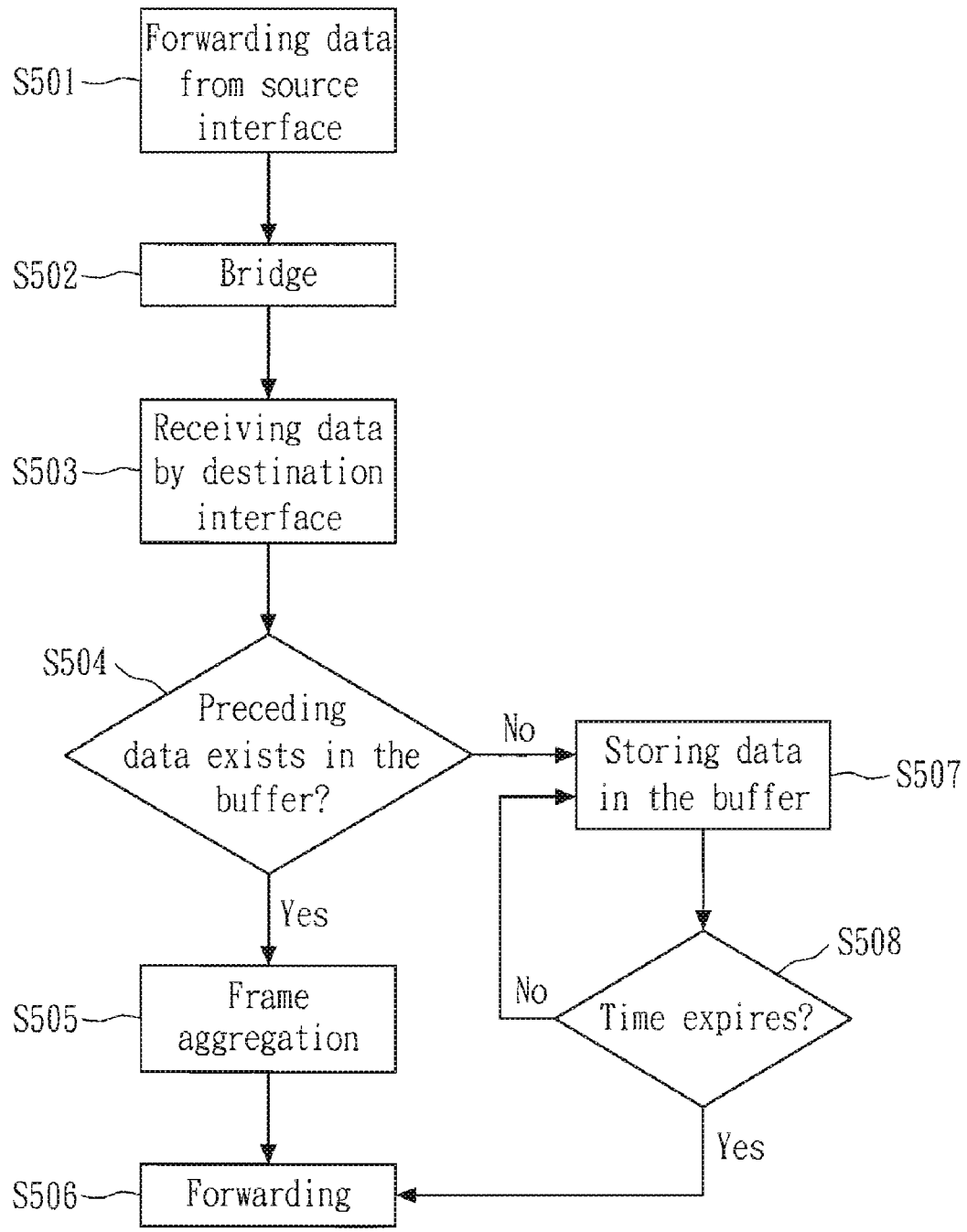
FIG. 5 shows a conventional flowchart for forwarding packets.
Figure 6:
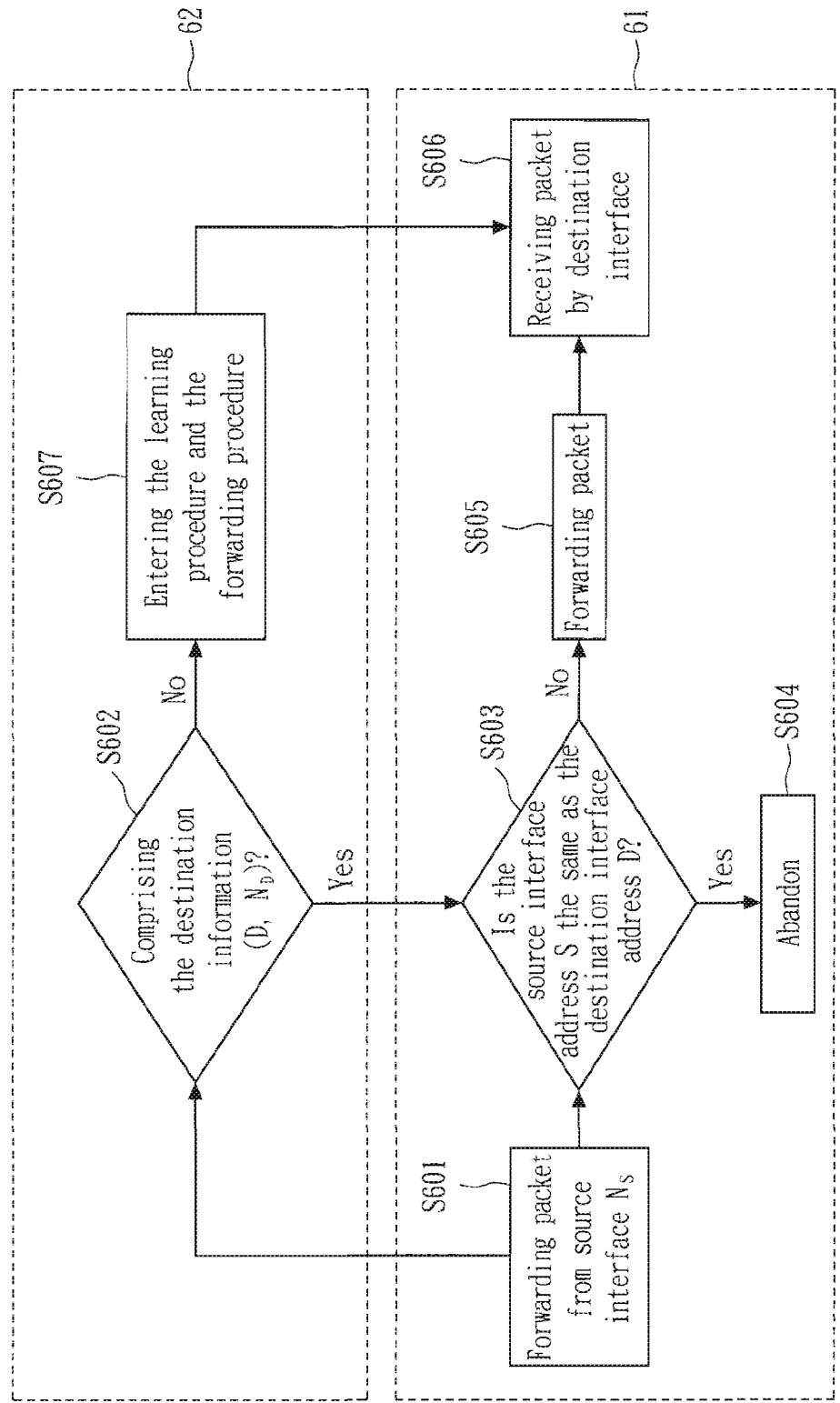
FIG. 6 is a flow chart illustrating the preferred embodiment according to a method of the present invention.

FIG. 6 is a flow chart illustrating the preferred embodiment of the method of the present invention. A first working layer 61 and a second working layer 62 handle network data transfer with the first working layer 61 having higher CPU priority than the second working layer 62. At step S601, a packet is forwarded from a first interface, and the packet contains data indicating a source interface $N_S$, a source interface address S, a destination interface $N_D$ and a destination interface address D. The packet is employed as, for example, a command, input data, output data, a response, or prepared for forwarding. At step S602, the packet is forwarded to the second working layer 62 through an interface (not shown) of the first working layer 61 and a forwarding table of a bridge in the second working layer 62 is checked to verify whether it comprises destination information (D, $N_D$) of the packet. The source interface address S is the address of the first interface while the destination interface address D is the address of a second interface. If a corresponding address is found, the packet is forwarded to the first working layer 61 for checking whether the source interface address S is the same as the destination interface address D at step S603. The mentioned interface addresses are known as media access control addresses. At step S604, if the source interface address S is the same as the destination interface address D, the packet is abandoned. At step S605, if the source interface address S is different from the destination interface address D, the packet is forwarded to the destination interface through a driver layer instead of passing through the bridge in the first working layer 61. At step S607, if the destination address of the packet does not exist in the forwarding table of the bridge, the packet is forwarded to the bridge and further forwarded to the destination interface with the learning procedure and the forwarding procedure of the bridge. At step S606, the packet is received by the destination interface $N_D$.

Figure 7:
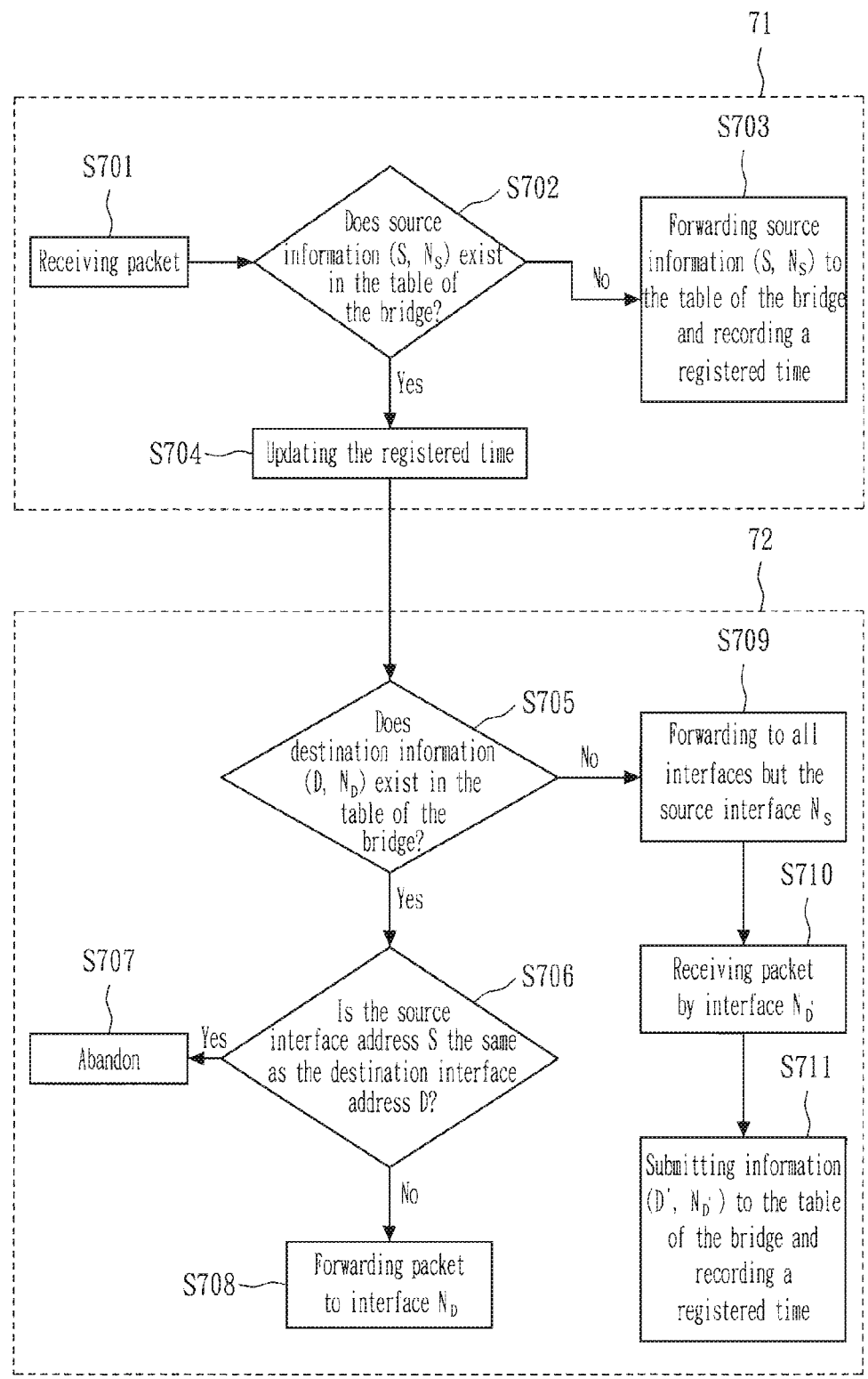
FIG. 7 shows the detailed steps of step S607.

FIG. 7 shows the detailed steps of step S607. Number 71 represents a learning procedure of the bridge while number 72 represents a forwarding procedure of the bridge. At step S701, the packet with source information (S, $N_S$) and destination information (D, $N_D$) is received by the bridge. At step S702, the source information (S, $N_S$) is checked to determine whether it exists in the forwarding table of the bridge. If it does not, at step S703 the source information (S, $N_S$) is submitted to the forwarding table of the bridge and a registered time for the source information (S, $N_S$) is recorded. At step S704, if the source information (S, $N_S$) already exists in the forwarding table of the bridge, a preceding registered time of the source information (S, $N_S$) is updated. At step S705, the destination information (D, $N_D$) is checked to determine whether it exists in the forwarding table of the bridge. If it does, at step S706, the destination interface address D is checked with the source interface address S. If the two addresses are the same, at step S707, the packet is abandoned. If the two addresses are different, at step S708, the packet is forwarded to the destination interface $N_D$. On the other hand if the destination information (D, $N_D$) does not exist in the forwarding table of the bridge, the packet is forwarded to all interfaces except the source interface $N_S$ at step S709. At step S710, a destination interface $N_{D'}$ receives the packet. At step S711, a receipt information (D', $N_{D'}$) is registered in the forwarding table of the bridge and the registered time for the receipt information (D', $N_{D'}$) is recorded.

Figure 8:
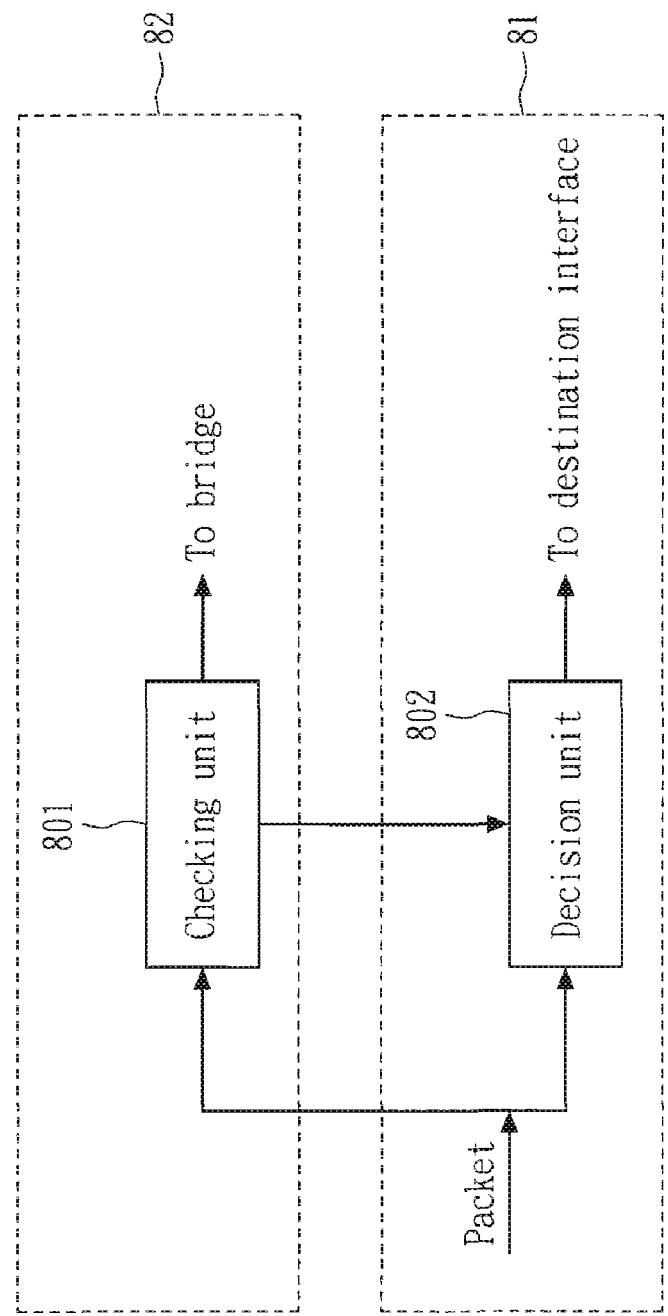
FIG. 8 is a block diagram of the apparatus for forwarding packets in accordance with another embodiment of the invention.

FIG. 8 is a block diagram of the apparatus for forwarding packets in accordance with another embodiment of the invention. A packet forwarding apparatus comprises a checking unit 801 and a decision unit 802, wherein the checking unit 801 is placed in a second layer for checking the forwarding table of the bridge while the decision unit 802 is placed in a first layer. The first working layer has a higher priority in CPU than the second working layer. The decision unit 802 is coupled to the checking unit 801. A forwarding path of a packet is determined in accordance with a checking result of the checking unit 801.

When the checking unit 801 receives an input packet containing data indicating the source interface $N_S$, the source interface address S, the destination interface $N_D$ and the destination interface address D, the checking unit 801 checks a forwarding table of the bridge in the second working layer to verify whether it comprises the destination information (D, $N_D$) of the packet. If the destination information (D, $N_D$) of the packet does not exist in the forwarding table of the bridge, the packet is forwarded to the bridge directly. If the destination information (D, $N_D$) of the packet exists in the forwarding table, the checking unit 801 submits the result to the decision unit 802 in the second working layer. The decision unit 802 compares the destination interface address D with the source interface address S. If the two addresses are the same, the packet is abandoned. If the two addresses are different, the decision unit 802 in the first working layer forwards the packet to the destination interface $N_D$ directly without passing through the bridge to accelerate the packet forwarding speed.

In contrast to prior arts in which packets are forwarded through bridges, another forwarding path is disclosed in the embodiments of the present invention for packets forwarded to the same destination to allow more frame aggregations of APs and enhance WLAN throughput. In addition, packets forwarded to the same destination are forwarded through the first working layer. Because the first working layer has a higher priority in CPU than the second working layer, packets forwarded through the first working layer can reach the destination faster than packets forwarded through the second working layer.

The above-mentioned apparatus can be implemented with software, firmware or hardware and any platform with single processor or with multiple processors. The apparatus according to the present invention improves the WLAN throughput when used with a slow CPU.

The above-described embodiments of the present invention are intended to be illustrative only. Numerous alternative embodiments may be devised by persons skilled in the art without departing from the scope of the following claims.

What is claimed is:

1. A method for forwarding packets, said method comprising the steps of:
    forwarding a packet to a second working layer through an interface of a first working layer;
    comparing registered data of a forwarding table with a destination interface address of the packet in the second working layer and submitting a comparison result to the first working layer; and
    determining a forwarding path for the packet to the destination interface address in accordance with the comparison result.

2. The method of claim 1, wherein the step of determining a forwarding path for the packet comprises determining a forwarding path for the packet through a bridge or a driver layer in accordance with the comparison result.

3. The method of claim 2, wherein the step of determining a forwarding path for the packet further comprises if a destination interface address of the packet is the same as a destination address stored in the forwarding table, then the packet is forwarded through the driver layer.

4. The method of claim 2, wherein the step of determining a forwarding path for the packet further comprises if the forwarding table does not contain a destination address the same as the destination interface address of the packet, the packet is forwarded through the bridge.

5. The method of claim 1, further comprising a step of abandoning the packet if a source interface address of the packet is the same as the destination interface address of the packet.

6. The method of claim 1, wherein the packet includes source interface information and destination interface information, and the source and destination interface information comprise media access control addresses of the interfaces.

7. The method of claim 1, wherein the first working layer has a higher priority in using a CPU than the second working layer in using the CPU.

8. The method of claim 1, wherein the first working layer is a driver layer and the second working layer is a bridge.

9. An apparatus for forwarding packets, said method comprising:
    a decision unit placed in a first working layer for determining whether to abandon a packet in accordance with a source interface address of the packet being the same as a destination interface address of the packet; and a checking unit placed in a second working layer for checking a forwarding table with the destination interface address of the packet and generating a checking result;

wherein a forwarding path to the destination interface address for the packet is determined in accordance with the checking result.

10. The apparatus of claim 9, wherein the forwarding path to the destination interface address is either through the first working layer or the second working layer.

11. The apparatus of claim 10, wherein the first working layer is a driver layer and the second working layer is a bridge.

12. The apparatus of claim 11, wherein if a destination address stored in the forwarding table is the same as the destination interface address of the packet, the packet is considered to be forwarded through the driver layer.

13. The apparatus of claim 11, wherein if the forwarding table does not contain a destination address the same as a destination interface address of the packet, the packet is forwarded through the bridge.

14. The apparatus of claim 9, wherein the first working layer has a higher priority in using a CPU than the second working layer in using the CPU.

* * * * *